United States Patent [19]

McGauley

[11] 4,061,716

[45] Dec. 6, 1977

[54] PROCESS FOR THE PRODUCTION OF SORBENT SOLIDS FOR USE IN THE DESULFURIZATION OF GASES

[76] Inventor: Patrick John McGauley, 7 Plymouth Road, Port Washington, N.Y. 11050

[21] Appl. No.: 697,384

[22] Filed: June 18, 1976

Related U.S. Application Data

[63] Continuation-in-part of Ser. No. 509,781, Sept. 27, 1974, abandoned, which is a continuation-in-part of Ser. No. 403,950, Oct. 5, 1973, abandoned.

[51] Int. Cl.$^2$ .......................................... C01B 17/60
[52] U.S. Cl. .................................. 423/244; 252/190; 252/191; 423/153; 423/154; 423/242
[58] Field of Search ................ 252/191, 190; 423/153, 423/154, 553, 554, 242, 244, 538, 632, 634; 75/1; 23/313 R

[56] References Cited

U.S. PATENT DOCUMENTS

| | | | |
|---|---|---|---|
| 1,412,452 | 4/1922 | Coolbaugh | 423/532 |
| 2,202,414 | 5/1940 | Barnes et al. | 423/153 |
| 3,330,096 | 7/1967 | Zimmerly | 423/244 |
| 3,669,617 | 6/1972 | Lowicki et al. | 423/244 |
| 3,917,800 | 11/1975 | McGauley et al. | 423/244 |

FOREIGN PATENT DOCUMENTS

| | | | |
|---|---|---|---|
| 183 of | 1873 | United Kingdom | 423/242 |
| 2,987 of | 1858 | United Kingdom | 423/242 |
| 3,178 of | 1857 | United Kingdom | 423/242 |
| 1,003,419 | 9/1965 | United Kingdom | 423/244 |

Primary Examiner—Richard E. Schafer
Assistant Examiner—Irwin Gluck
Attorney, Agent, or Firm—Mandeville and Schweitzer

[57] ABSTRACT

This disclosure describes a process for the preparation of iron-bearing and calcium-bearing sorbent solids for use in the desulfurization of gases. The process involves mechanical procedures for generating porous agglomerated solids that are high in surface area and uniquely suitable in both particle size and mechanical properties for processing in gas-solids contacting equipment of conventional design. The process also involves the use of water in the agglomeration procedures in quantities controlled to react both chemically and mechanically with solid components of the feed materials and to generate adhesive cement between finely divided solids in porous agglomerated particles of the sorbent product.

16 Claims, 3 Drawing Figures

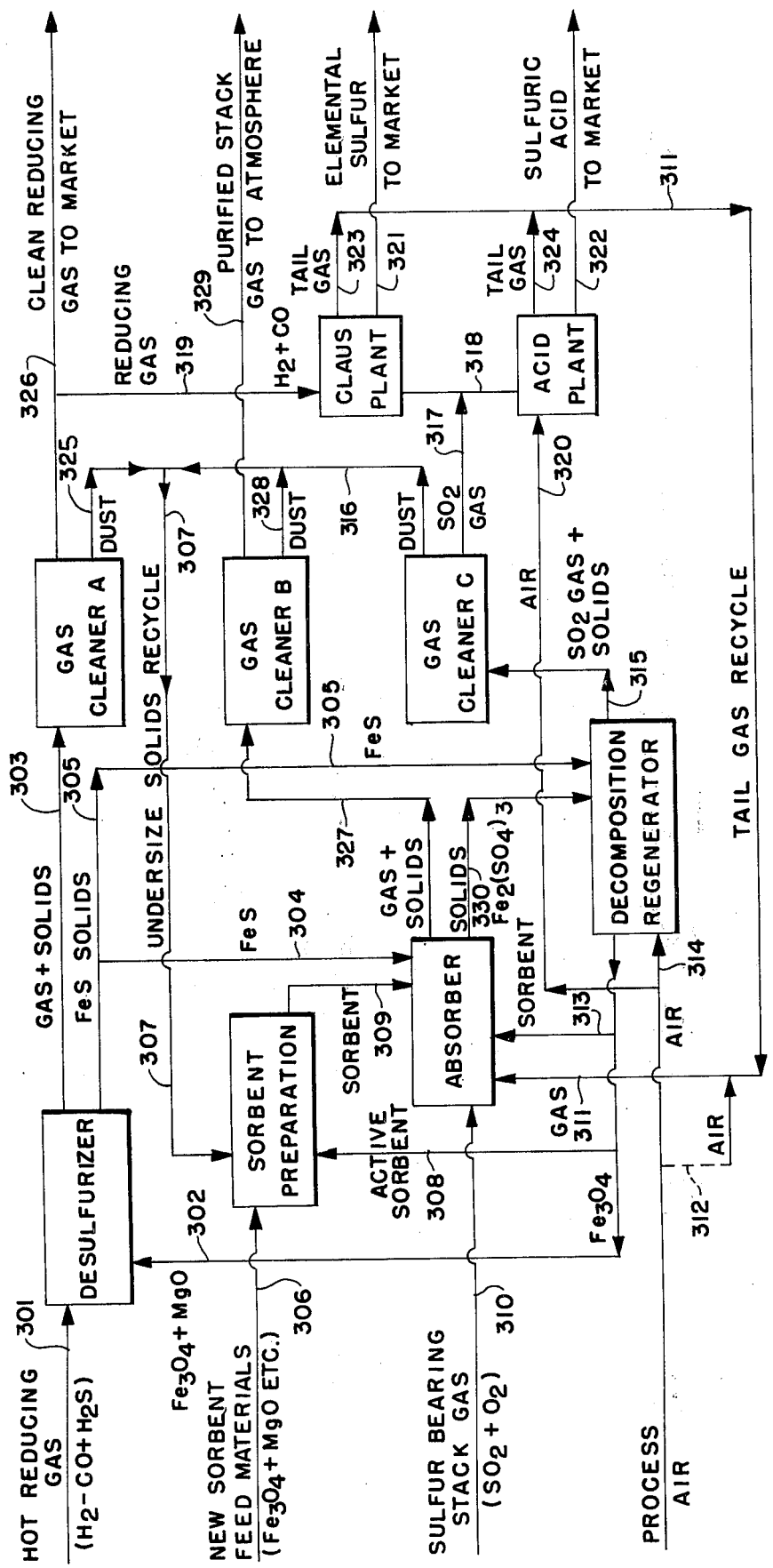

PROCESS FOR THE PRODUCTION OF SORBENT SOLIDS FOR USE IN THE DESULFURIZATION OF GASES

CROSS REFERENCE TO RELATED APPLICATION

This application is a continuation-in-part of my co-pending U.S. application Ser. No. 509,781, filed Sept. 27, 1974, now abandoned, which in turn was a continuation-in-part of U.S. application Ser. No. 403,950, filed Oct. 5, 1973, now abandoned. This application is also closely related to the subject matter of the Patrick J. Mc Gauley U.S. Pat. No. 3,917,800, the disclosure of which is hereby incorporated by reference.

BACKGROUND OF THE INVENTION

This invention relates to a method of preparing improved sorbents for the removal of sulfur compounds from sulfur-bearing gases.

Air pollution with sulfur dioxide is a major problem in the United States today. Sulfur dioxide is objectionable principally because above relatively low concentrations it is toxic to human beings and animals and is destructive to vegetation. Sulfur dioxide and its oxidation products, sulfur trioxide and sulfuric acid, are a major source of acidity in rain and fog which in turn can be corrosive.

Industrial plants that utilize sulfur-bearing commercial fuels such as coal or residual oil in the production of glass, lime, cement, ceramics, metals, and/or electric power, etc., are major sources of sulfur dioxide emissions to the atmosphere. Moreover, plants that utilize these raw fuels as feed materials in the production of refined fuels or chemicals such as coke, ammonia, methanol, formaldehyde, methane, and industrial gases also involve the production of reducing gases containing hydrogen, carbon monoxide and hydrogen sulfide.

Objectionable sulfur dioxide-bearing gases also are generated as waste gases in the smelting of sulfur-bearing minerals, the refining of sulfur-containing crude oils, the synthesis of sulfuric acid, the sulfonation of hydrocarbons, the production of sulfur by the Claus process, the production of paper by way of a wood-pulping process, and similar industrial processes.

Furthermore, the discharge of gas streams containing sulfur dioxide into the atmosphere constitutes a waste of a useful material because the sulfur content thereof is a potentially useful industrial commodity. Currently, tens of millions of tons of sulfur oxides are released into the atmosphere over populated regions of the United States each year. Thus, the recovery of some of this sulfur either as such or in another form could result in the accumulation of a supply of useful chemicals of significant value.

Many processes are available and/or have been proposed both for the removal of sulfur dioxide from oxygen bearing combustion gases and/or for the removal of hydrogen sulfide from reducing gases. Most of these processes involve scrubbing the gases in contact with organic or aqueous solutions of alkaline chemicals to extract the acid sulfur compounds by either physical and/or chemical reactions between components of the gases and liquids. The reactive chemicals utilized in these processes include ammonia, organic amines, and oxides, carbonates and sulfites of alkali and alkaline earth metals.

Wet processes of the type discussed above, however, generate sulfur-bearing solutions and/or slurries that must be either regenerated or discarded as waste. Moreover, the combined treatment and regeneration processes are expensive in both capital and operating costs, and the sulfur-bearing effluents, when discarded, frequently generate alternate water pollution problems.

The scrubbing of gases in contact with solutions also involves cooling the gases to temperatures near to or below the boiling point of the scrubbing liquor. Wet processes, therefore, have the disadvantage of both operating at low temperatures and of generating product gases that are saturated with water vapor. Moreover, if these cold gases are released to the atmosphere they will remain near ground level, and frequently will pollute the local ambient air more seriously than would the untreated but hot flue gas.

The wet processes are particularly disadvantageous when utilized in the treatment of hot gases. Moreover, when utilized in the desulfurization of gases such as the hot reducing gases from the partial combustion of sulfur-bearing coal or fuel oil, etc., these processes are unusually costly in heat transfer equipment and wasteful in energy consumption.

Other processes that have been either utilized or proposed for use in the desulfurization of either combustion gases containing sulfur and oxygen, and/or reducing gases containing hydrogen sulfide, involve contacting the gases with dry solid sorbents. Processes of this type may be sub-divided into general classifications as follows:

a. Processes that utilize the physical properties of sorbents such as activated alumina, activated carbon, and silica gel, and operate at low temperatures; and b. Processes that utilize minerals and chemicals such as dolomite, magnesite, calcite, siderite, magnetite, hematite, bauxite, lime, soda ash and/or magnesia, etc., as solid sorbents containing components that react chemically with sulfur compounds in the gas, and operate at relatively high temperatures.

Processes of the type described in (a) above, which operate at low temperatures, have disadvantages similar to those of the wet processes described previously. Moreover, sorbents that utilize the physical properties of solids to separate components of gases, are generally low in capacity, low in operating life, and costly both to produce and to regenerate.

Processes of the type described in (b) above, which utilize dry minerals and/or chemicals as active sorbents for sulfur from gases, have been proposed for use, and some have been used commercially in the desulfurization of both combustion gases containing oxygen and oxides of sulfur, and reducing gases containing carbon monoxide, hydrogen, and hydrogen sulfide. Some of these processes have involved addition of the sorbents to the combustion fuel, and discard of the reacted products with the ash or residue from the combustion furnace. Other similar processes have involved partial oxidation of the fuel with air or oxygen and steam, desulfurization of the reducing gas products in contact with the solid sorbents, and discard of the spent sorbent as solid waste.

The minerals or chemicals utilized in the above type of processes, such as limestone, lime, dolomite or soda ash, etc., generally are employed at a ratio higher than stoichiometric to sulfur in the fuel, and the finely divided of the reacted solids are difficult to separate from the gas. Moreover, the large quantities of sorbent used in these processes are costly to obtain, and the spent sorbents are costly to discard as solid waste, and after discard are a potential source of water pollution.

When commercial fuels such as coal or residual oil are utilized as raw materials in the production of ammonia, methanol, methane, fuel gas, or combined cycle electric power, etc., an early step of the conversion process generally involves partial combustion of these fuels with air or oxygen and steam, to produce hot reducing gases containing hydrogen and carbon monoxide. Moreover, when the available fuels contain sulfur, the hot reducing gases are contaminated with hydrogen sulfide and carbonyl sulfide, etc., and generally must be desulfurized for use in the synthesis or conversion processes.

Conventional processes for the desulfurization of hot reducing gases of the above type, generally involve cooling the hot gas, desulfurizing the cooled gas in contact with aqueous solutions of alkaline chemicals, and reheating the desulfurized gas for use in the conversion processes. Processes of this type generally utilize heat exchange equipment of alloy construction, and generally are costly in capital investment and wasteful in energy consumption.

Alternative processes for the desulfurization of reducing gases in contact with minerals or chemicals at high temperatures have been proposed, and some of these processes have been test operated in pilot plant equipment. Most of these processes involve the use of limestone or dolomite as a sorbent for sulfur, and involve chemical reactions between calcium in the minerals and sulfur in the gas to produce calcium sulfide and/or calcium sulfate in the reacted solids.

Processes of the above type, however, utilize calcium at a high ratio to sulfur on a stoichiometric basis, consume large quantities of sorbents, and generate large quantities of solid waste. Moreover, both the calcium sulfide and sulfate components of the spent sorbent are both highly stable and unusually costly to regenerate for reuse as sorbents in the process.

In view of the increasing demand for energy, the decreasing supply of low sulfur fuels, and the large known reserves of sulfur-bearing coal, there is an increasing demand for a low cost process for the desulfurization of sulfur-bearing gases.

SUMMARY OF THE DISCLOSURE

This disclosure describes a process for the preparation of dry solids that are both suitable for contacting with gases in gas-solids contacting equipment, and have unusual properties for use in the desulfurization of sulfur-bearing gases. The preferred solid sorbent products are the iron-bearing and the calcium-bearing solids, and both of these are capable of desulfurizing either oxygen-bearing combustion gases, or hydrogen-bearing reducing gases. Moreover, both also are effective with either type of gases when contacted at various temperatures between 150° and 1800° C. The iron-bearing prepared sorbents, when utilized in the desulfurization of oxygen-bearing gases at temperature of contact below about 550° C., preferably are prepared from iron-bearing solids containing either ferrous sulfate or iron oxides generated from iron sulfates at temperatures below about 750° C., and these solids generally contain both iron oxides and iron sulfates.

This disclosure describes procedures for utilization of the improved sorbent solids in the desulfurization of either of the above types of gases. It also describes procedures for regenerating the spent sorbents from the desulfurization of either type of gases in contact with the iron-bearing sorbents. The calcium-bearing sorbents are either discarded as solid waste, or are regenerated by processes other than those described in this disclosure.

This disclosure also describes procedures for generating refractory solids for use as diluent materials in the iron-bearing sorbents, and procedures for utilizing these sorbents in the desulfurization of reducing gases at temperatures above 750° C.

All desulfurization processes that are utilized for the purpose of air pollution control are essentially negative in economic impact, and most conventional processes are unusually costly in operating economy. The features of the process of this invention that significantly improve economy and efficiency of operation and simultaneously distinguish it from all known alternative processes are summarized as follows:

1. The combination of mechanical and chemical procedures utilized in accordance with the invention in preparation of the sorbent solids and their use in the desulfurization of gases, are unusually high in performance and low in both capital and operating costs, in comparison with the procedures of all known conventional alternative processes.

2. The procedures of the new process enable the repeated recycle, regeneration, and reuse of sorbent solids and, in comparison with all known alternative processes, the demands for new solid feed to the sorbent preparation process, and thus the cost of raw materials in the desulfurization of gases are unusually low.

3. The novel procedures for the preparation and use of solid sorbents in the process of this invention, enable the utilization of either iron or calcium compounds as both the major and the chemically effective components of the prepared sorbents. Moreover, both of these compounds normally are commercially available as major components of industrial minerals, chemicals, and/or waste materials at costs that are attractively low.

4. The sorbent preparation procedures of this invention provide dry sorbent solids that are highly effective in the desulfurization of either oxygen-bearing combustion gases, or hydrogen-bearing fuel gases. These solids are non-corrosive to process equipment under most operating conditions and, when utilized for the desulfurization of combustion gases at power generating facilities, can be proessed in equipment fabricated from low cost structural materials. In comparison with the "wet scrubber" desulfurization processes utilized in conventional power plants, the desulfurization processes utilizing the materials of this invention have capital and maintenance costs that the unusually low.

5. The sorbent preparation and regeneration procedures of this invention, when utilized in power generating plants as described in (4) above, have important economic advantages deriving from low demands for operating supplies and from minimum requirements for the disposal of wastes. In additional, there are advantages to be derived from the production of marketable sulfur and from increased output of marketable power from the primary fuel supply. Net power generating costs can thus be significantly reduced, in comparison to the conventional.

6. The processes of this invention, when utilized in conjunction with power generating facilities as described in items (4) and (5) above, further enable the utilization of lower quality, higher sulfur fuels (of which there are large known reserves) at significant savings in the cost of the fuel.

7. The process of this invention, when utilized in conjunction with the desulfurization of reducing gases at low gas-solids contacting temperature (below about 350° C), and compared with certain commercially available alternative processes, is at least marginally attractive in economic impact. However, when utilized in conjunction with the desulfurization of reducing gases at temperatures between 350° and 750° C, the procedures of the invention become increasingly attractive in operating economy with increasing temperatures of the available gases.

8. When iron-bearing sorbents are prepared in the above process, and are intended to be contacted with reducing gases at temperatures above about 750° C, magnesium and/or aluminum bearing diluent material are utilized as part of the new fee material. These components, after conversion to their inert oxides by procedures of the process, eliminate certain mechanical problems in the gas-solids contacting equipment, and permit the sorbents to be utilized in the regenerative desulfurization of these gases. In comparison with all known alternative processes for the desulfurization of reducing gases obtained from the partial combustion of fuels at temperatures above 750° C, this process is essentially unique in currently available technology. When such sorbents are utilized in combined cycle power generation from coal, and in other industrial applications that utilize gasification processes in the treatment of sulfur-bearing fuels, it provides for increased recovery of energy from the fuel, and significant saving in the production cost of clean fuel gases.

9. When the sorbent materials of the invention are utilized in the regenerative desulfurization of either oxygen-bearing combustion gases or hydrogen-bearing fuel gases, both magnetite-bearing solids, and hot gases high in concentration of sulfur dioxide and favourable for use as fee in the production of either acid and/or sulfur, are obtained as products of the process.

BRIEF DESCRIPTION OF THE DRAWINGS

FIG. 3 is a flow diagram illustrating the preparation and regenerative utilization of agglomerated sorbent materials and in conjunction with the desulfurization of a reducing gas and an oxidizing gas.

DESCRIPTION OF THE PREFERRED EMBODIMENTS

Figure 1:
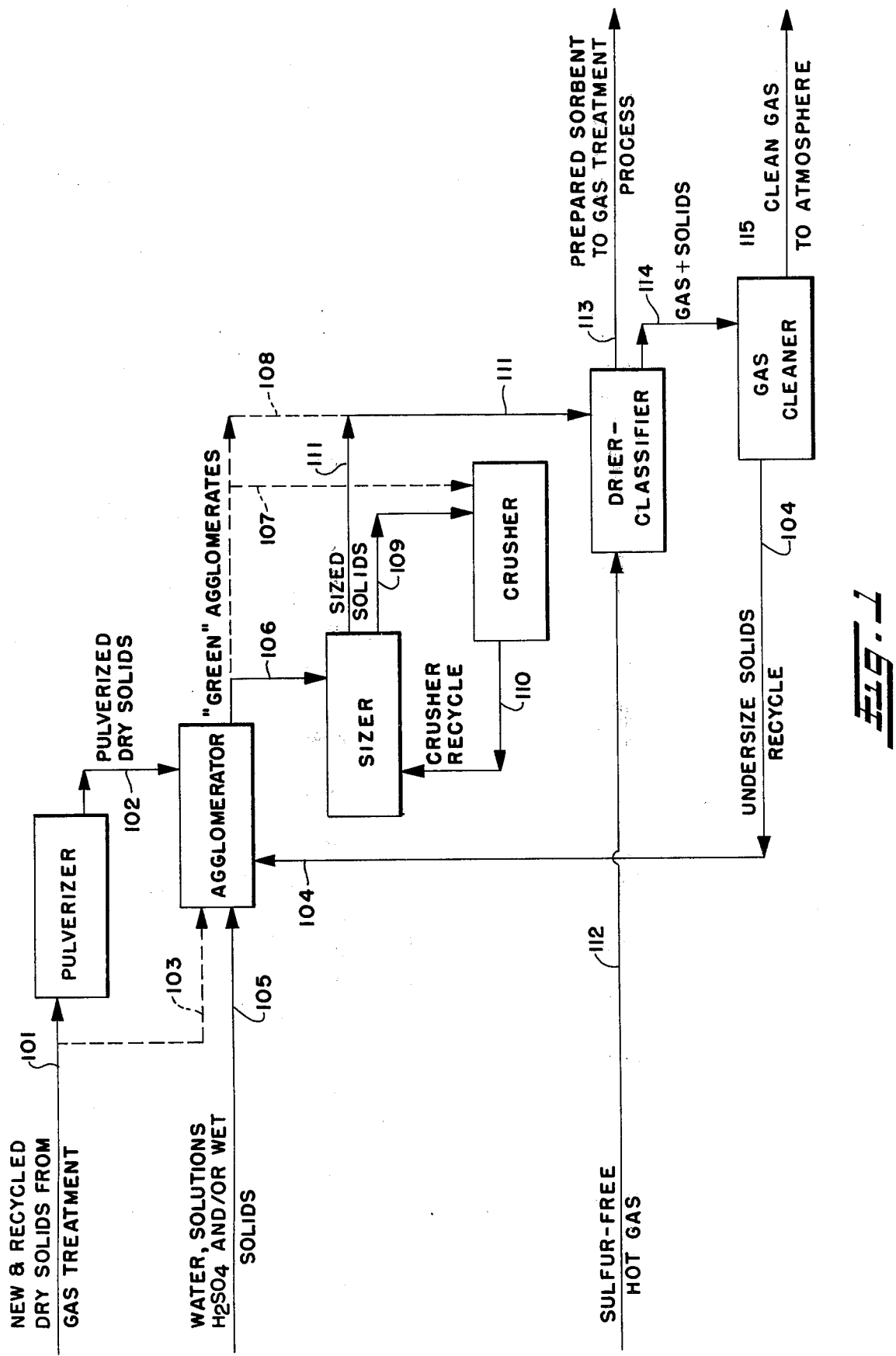
FIG. 1 is a flow diagram showing one operation for providing agglomerated sorbent materials according to the invention.

This invention provides a process for preparing dry, sorbent solids that are suitable in both particle size and physical and mechanical properties for contacting with gases in gas-solids contacting equipment. These solids also have unusual properties for use as sorbents for sulfur compounds from dilute sulfur-bearing gases. The sorbent products are uniquely suitable for use in the desulfurization of either oxygen-bearing combustion gases or hydrogen-bearing reducing gases. Moreover, both are effective at various ranges of gas-solids contacting temperatures between the practical limits of 150° and 1800° C.

The general process for preparing dry sorbent solids according to the invention involves the following steps:

a. Finely divided solids, containing suitable sorbent materials, are mixed with water, sulfuric acid, or aqueous mixtures containing sulfuric acid. The mixed liquids and solids are blended at temperatures below 100° C. and at ratios sufficient to generate moist agglomerated solids which contain water soluble or reversibly hydratable compounds of such solids. The agglomerated solids are essentially free of particles smaller than ten microns in size.

b. The moist agglomerated solids are sized, to separate particles larger than one-quarter inch in diameter; the smaller particles are collected as a product of the sizing procedure.

c. The moist product solids collected in the sizing procedure are contacted in a reactor with gases at temperatures between 80° and 300° C. to evaporate water from the interior of particles, and thus to generate porous agglomerated dry solids. These solids are high in both mechanical strength and in aggregate surface area.

d. The dry solids are then classified to remove particles smaller than 200 microns in diameter.

e. The classified solids are collected as the primary product of the sorbent preparation process.

In a preferred embodiment of the invention, the classification of particles in step (d) is carried out in and simultaneously with contacting step (c) by operating the reactor at a gas flow rate that elutriates from the bed of the reactor, the available particles smaller than 200 microns in diameter.

In other embodiments, the process may involve the addition of one or all of the following procedural steps:

f. The oversize solids from the sizing step may be crushed and recycled as part of the feed to the sizing step.

g. The solids elutriated from the bed of the reactor may be separated from the gas in gas cleaning equipment, and the clean gas discharged to the atmosphere as an effluent of acceptable quality.

h. The solids collected at the gas cleaner may be recycled for use as part of the recycled feed to the mixing and agglomeration procedures.

Sorbent solids prepared in accordance with the process of this invention include those solids which are suitable for absorption of sulfur from gases containing the same. In general, the sorbents are reactive with sulfur and absorb sulfur by forming a new chemical compound as will be described more fully below.

Examples of solid sorbents wich can be prepared in accordance with the process of the invention include the oxides and hydroxides or iron, calcium, sodium, magnesium, manganese, copper, etc. Iron is a particularly preferred sorbent solid prepared by the process of the invention and it is utilized as iron oxide, ferrous sulfate or mixtures thereof. Although the foregoing are known sorbents for sulfur, the sorbent preparation process of this invention significantly improves the capacity and usefulness of the sorbents for the desulfurization of gases in commercial scale operations.

When iron-bearing sorbents are the desired product from the sorbent preparation process, finely divided iron-bearing minerals or industrial materials such as limonite, hematite, magnetite, siderite, pyrrhotite, iron oxides, sulfates or sulfides may be utilized as the feed materials to the mixing step, and the aqueous mixture generally will contain iron sulfate or iron carbonate. Iron sulfates in the feed materials are utilized as the active components of the cement in the agglomeration procedure of the sorbent preparation process.

When the iron-bearing sorbent products from the preparation process are utilized in the desulfurization of oxygen-bearing combustion gases containing, for example, $SO_2$ or $SO_3$, the prepared sorbents must contain either ferrous sulfate or active iron oxides such as those generated from iron sulfates at temperatures below 750° C., and preferably below 650° C. Active iron oxides of the desired type can be generated from iron sulfate-bearing solids by regeneration procedures described in copending application Ser. No. 403,953, filed Oct. 5, 1973, the disclosure of which is incorporated herein by reference. Moreover, the dry solid feed to the sorbent preparation process normally will contain this type of iron oxide as a major component.

The iron oxide-containing sorbent products, prepared according to the invention, are used in the desulfurization of oxygen-bearing gas at contacting temperature below 550° C. and preferably below 450° C. This desulfurization process normally generates a product gas of reduced suflur content which is acceptable for discharge to the atmosphere, from oxygen-bearing feed gases generated by the combustion of sulfur-bearing fuels. The resulting product solids generally are high in content of ferric sulfate, and this product may be formed by chemical reactions such as the following:

1. $2FeSO_4 + SO_2 + O_2 = Fe_2(SO_4)_3$

2. $2Fe_3O_4 + 9SO_2 + 5O_2 = 3Fe_2(SO_4)_3$

3. $2Fe_2O_3 + 3O_2 + 6SO_2 = 2Fe_2(SO_4)_3$

4. $2Fe_3O_4 + 4O_2 + 7SO_2 + 2SO_3 = 3Fe_2(SO_4)_3$

5. $2FeSO_4 H_2O + O_2 + SO_2 = Fe_2(SO_4)_3 + 2H_2O$

The iron-bearing product solids from the sorbent preparation process also may be used to reduce the sulfur content of reducing gases. The sulfur in these gases may be present in the following forms: $H_2S$, $COS$, $RSH$, $R_2S$, or $RSSR$ wherein R is an organic radical.

When the iron-bearing product solids from the sorbent preparation process are used in the desulfurization of such reducing gases at contacting temperatures below about 750° C., the sorbents are prepared as described above. The desulfurization of reducing gases by this process generates product gases that are acceptable for industrial use as a desulfurized fuel. The resulting product solids generally are high in content of iron sulfides which may be formed by chemical reactions such as the following:

6. $Fe_2O_3 + 2H_2S + H_2 = 2FeS + 3H_2O$

7. $Fe_3O_4 + 3H_2S + H_2 = 3FeS + 4H_2O$

8. $Fe_2O_3 + 2H_2S + CO = 2FeS + 2H_2O + CO_2$

9. $Fe_3O_4 + 3COS + CO = 3FeS + 4CO_2$

10. $Fe_3O_4 + 4H_2 = 3Fe + 4H_2O$

11. $Fe + H_2S = FeS + H_2$

12. $FeS + H_2S = FeS_2 + H_2$

The particles of iron sulfide-bearing spent sorbent are relatively low in melting temperature, and when processed in desulfurization equipment at gas-solids contracting temperatures above about 750° C, these solids have a tendency to become adhesive and to obstruct the mechanical performance of the equipment. We have found that finely divided magnesium and/or aluminum compounds, and/or certain types of fly ash, when utilized as diluent components of the new iron-bearing feed to the sorbent preparation process, have permitted mechanical operation of the gas-solids contacting equipment at temperatures up to at least 1200° C.

We have found that finely divided minerals and/or chemicals such as megnesite, high magnesia dolomite, magnesium carbonate, oxide, and/or hydroxide etc., and bauxite, aluminum oxide, and/or hydroxide etc., and high magnesia and/or alumina-bearing fly ash etc., are effective diluent components of the new iron-bearing feed to the sorbent preparation process. Morover, we have found that the magnesium and aluminum components of the above diluent materials in the feed, are converted to the chemically inert oxides of magnesium and aluminum by procedures of the process, and that these oxides do not participate significantly in the chemical reactions of the desulfurization and regeneration procedures.

The regeneration process which may be utilized in this invention to prepare active iron oxides for use in the sorbent preparation process, involves the production of $Fe_3O_4$-bearing solids from iron sulfate-bearing feed materials under controlled conditions of temperature and gas composition. This process, which is described more fully in copending application Ser. No. 403,953, filed Oct. 5, 1973, involves contacting the iron sulfate-bearing spent sorbents from the desulfurization of oxygen-bearing gases, with both reducing agents and air in gas-solids contacting equipment. The reducing agents may be either solid, liquid, or gaseous carbonaceous fuels of commercial quality, and preferably are hydrogen-bearing reducing gases generated from one or more of the commercial fuels. The reducing agents may include iron sulfide-bearing minerals and/or iron sulfide-bearing solids. Thus, an active iron oxide sorbent may be regenerated from a mixture of iron sulfate and iron sulfide.

The regeneration of iron oxide also involves supplying each component of the total combined solid, liquid, and gaseous feed to the reaction zone of the regenerator at ratios that provide both oxygen and reducing agents (or fuel) both in quantities and at stoichiometric ratios in the reaction zone, that satisfy the following conditions:

a. Provide exothermic heat sufficient in quantity to maintain the temperature of the reaction zone between the limits of 400° and 750° C., and preferably between about 550° and 650° C.;

b. Generate product gases containing both sulfur dioxide and reducing agents at ratios that approach the equilibrium composition of gases in contact with $Fe_3O_4$ at the operating temperature of the reaction zone; and c. Generate reactive $Fe_3O_4$ as a major component of the iron oxide-bearing product from the reaction zone of the process.

The product gas from the reaction zone of the regenerator is high in content of sulfur dioxide and essentially free of oxygen. The product solids are high in content of Fe$_3$O$_4$ which may be generated by chemical reactions such as the following:

13. $3FeSO_4 + 2H_2 = Fe_3O_4 + 2H_2O + 3SO_2$

14. $3FeSO_4 + 2CO = Fe_3O_4 + 2CO_2 + 3SO_2$

15. $3Fe_2(SO_4)_3 + 10H_2 = 2Fe_3O_4 + 10H_2O + 9SO_2$

16. $3Fe_2(SO_4)_3 + 10CO = 2Fe_3O_4 + 10CO_2 + 9SO_2$

17. $Fe_2(SO_4)_3 + FeS = Fe_3O_4 + 4SO_2$

18. $2FeSO_4 + FeS + O_2 + Heat = Fe_3O_4 + 3SO_2$

19. $3FeS + 5O_2 = Fe_3O_4 + 3SO_2 + Heat$

The regeneration of Fe$_3$O$_4$ from the iron sulfide-bearing spent sorbents from the desulfurization of reducing gases in contact with iron-bearing prepared sorbents is accomplished by oxidation of the spent sorbent. Moreover, when both iron sulfate and iron sulfide-bearing spent sorbents are available, these sorbents are mixed, and the iron sulfide is utilized as both fuel and reducing agent, as indicated by the chemical reactions of equations 17–19 above.

When the available supply of iron sulfate-bearing spent sorbent is insufficient in quantity to cool the reaction zone by the endothermic reactions for generating iron oxides from iron sulfates, the excess heat is removed by the generation of steam in heat exchange equipment. Moreover, when the regenerated Fe$_3$O$_4$ bearing product from this process is to be used as sorbent in the desulfurization of reducing gases at temperatures above 750° C., the temperature of the reaction zone may exceed the maximum allowable temperature for the regeneration of iron sulfate-bearing spent sorbents, as described previously.

The above process for the regeneration of iron-bearing spent sorbents from the desulfurization of gases, when combined with the primary sorbent preparation process of the invention, provides a uniquely advantageous combined process. As will be apparent from the previous description and discussion, this regenerative combined process is highly flexible and generally is suitable for use in conjunction with the desulfurization of either oxygen-bearing effluent gases from the combustion of sulfur-bearing fuels, or sulfur-bearing reducing gases generated from these fuels.

When significant quantities of iron sulfates are available from industrial wastes, the combined process of the invention is capable, in conjunction with its use in the desulfurization of gases, of also generating both iron and sulfur products of saleable commercial quality, from the iron and sulfur content of the iron sulfates. This application of the process involves use of the available iron sulfate as new feed to the sorbent preparation process, and recovery of this component of the feed as part of the prepared sorbent product from this process. When this prepared product is contacted with gases containing both oxygen and oxides of sulfur, ferrous sulfate from the new feed is capable of extracting oxides of sulfur from the dilute gas, as indicated by equations 1 and 5, producing ferric sulfate.

When the ferric sulfate-bearing products from the desulfurization process are used as feed to the regenerator, the iron content of the iron sulfate is recovered as part of the active Fe$_3$O$_4$-bearing iron oxide product from this process. This product generally contains sulfur in excess of the allowable sulfur content of iron oxide products of commercial quality. When significant quantities of iron sulfates are used in the new feed to the combined process, product from the regenerator containing iron equivalent to the iron content of the iron sulfate feed, is removed for further desulfurization.

The above fraction of the Fe$_3$O$_4$-bearing product from the regenerator is contacted with air in gas-solids contacting "stripper" equipment. A fraction of the Fe$_3$O$_4$ in the feed to this "sulfur stripper" is converted to Fe$_2$O$_3$ in the product. Heat from the oxidation reactions increases the temperature of the reaction zone to a level generally above 750° C., and high enough to remove the remaining undesirable sulfur, by chemical reactions such as the following:

20. $4Fe_3O_4 + O_2 = 6Fe_2O_3 + Heat$

21. $4FeS + 7O_2 = 2Fe_2O_3 + 4SO_2 + Heat$

22. $2Fe_2(SO_4)_3 + Heat = Fe_2O_3 + 3SO_3$

23. $2Fe_3O_4 + SO_3 = 3Fe_2O_3 + SO_2 + Heat$

When calcium-bearing sorbents are desired for use in the desulfurization process, finely divided raw materials such as limestone or dolomite, and/or calcined limestone or dolomite are utilized as the new solid feed to the sorbent preparation process, and the aqueous mixtures may contain calcium compounds. Either gypsum and/or calcium hydroxide in the feed materials is utilized as the active components of the cement in the agglomeration procedure of the sorbent preparation process.

The calcium-bearing product solids from the sorbent preparation process are suitable for use in the desulfurization of either oxidizing or reducing gases. Although these sorbents are effective at temperatures between theoretical limits of about 200° and 1800° C., they generally are used at contacting temperatures between 300° and 1000° C. The operating procedures of the sorbent preparation process enable the production of sorbent products suitable for use in any desired type of gas-solids contacting equipment. The equipment selected for use in the desulfurization process generally will be determined by properties of the available gas.

When calcium-bearing sorbents are utilized in the desulfurization of oxygen-bearing gases, the spent sorbents are high in content of calcium sulfate and/or calcium sulfite. These components may be formed by chemical reactions such as the following:

24. $CaCO_3 + SO_2 = CaSO_3 + CO_2$

25. $2CaCO_3 + 2SO_2 + O_2 = 2CaSO_4 + 2CO_2$

26. $CaO + SO_2 = CaSO_3$

27. $CaO + SO_3 = CaSO_4$

28. $Ca(OH)_2 + SO_3 = CaSO_4 + H_2O$

29. $Ca(OH)_2 + SO_2 = CaSO_3 + H_2O$

30. $2Ca(OH)_2 + SO_2 + O_2 = 2CaSO_4 + 2H_2O$

When the calcium-bearing sorbents are utilized in the desulfurization of reducing gases, the spent sorbents are high in content of calcium sulfide. This component may be formed by chemical reactions such as the following:

31. $CaCO_3 + H_2S = CaS + CO_2 + H_2O$

32. $CaO + H_2S = CaS + H_2O$

33. $CaO + COS = CaS + CO_2$

34. $CaCO_3 + COS = CaS + 2CO_2$

35. $Ca(OH)_2 + H_2S = CaS + 2H_2O$

The finely divided solids generated in the gas contacting equipment used in either of the above desulfurization processes are separated from the product gases. A major fraction of these solids generally are recycled for use as part of the recycled feed to the mixing and agglomeration procedures of the sorbent preparation process.

When the spent sorbent products from the above desulfurization processes are regenerated by any available process that utilizes gas-solids contacting equipment, the finely divided solids elutriated from this equipment generally are recovered from the product gas. A major fraction of these elutriated solids generally is recycled for use as feed to the mixing and agglomeration procedures of the sorbent preparation process. Moreover, an additional fraction of the sorbent solids from the regeneration process generally are pulverized and recycled for use as part of the feed to the agglomeration procedures of the sorbent process. These solids generally contain densified particles that have become inert to chemical reactions with gases, presumably because the low surface area of the solids does not provide sufficient surface for contact with the gases.

The densified and inert solids discussed above frequently are found as components of sorbents that have been subjected to repeated changes in temperature when contacted with different gases in regenerative processes involving chemical reactions between gases and solids. When the above type of densified inert solids are pulverized and utilized as part of the feed to the sorbent preparation process of this invention, the original sorbent properties of the inert components are regenerated. Moreover, the combined products from the preparation process are not significantly different in sorbent properties than products generated from feed materials that are essentially free of densified and inert components.

The sorbent preparation process of this invention, as applied to the production of iron-bearing sorbents suitable for use in the desulfurization of combustion gases, is illustrated on the flow diagram of FIG. 1, and is described in detail with reference to this figure, as follows:

The available dry feed materials utilized in the preparation of the sorbents generally include both new and recycled iron oxide and/or iron sulfate-bearing solids. These solids may be combined with reactive $Fe_3O_4$ (magnetite) bearing solids obtained from the decomposition of iron sulfates and/or iron sulfide from the absorption processes previously described, and are fed either to the Pulverizer as indicated by line 101, or when sufficiently finely divided, are fed directly to the Agglomerator as indicated by line 103.

The finely divided products from both the Pulverizer and the Gas Cleaner also are fed to the Agglomerator as indicated by lines 102 and 104, respectively.

Water, sulfuric acid, and/or aqueous mixtures of solutions containing iron and sulfur compounds are fed to the Agglomerator as indicated by line 105, and mixed and blended with the dry solids in the Agglomerator at ratios that generate "green" pellets or agglomerates or porous moist solids that are essentially free of particles smaller than ten microns in diameter.

The "green" pellets or agglomerates are fed from the Agglomerator to a Sizer as indicated by line 106. Particles larger than one-quarter inch (and preferably larger than one-eighth inch) in diameter are considered oversize and are separated from the product and fed to the Crusher as indicated by line 109. In the Crusher, the large particles are reduced in size and recycled to the Sizer as indicated by line 110. The smaller product from the Sizer is fed to the Drier-Classifier as indicated by line 111.

In alternative embodiments, the wet solids produced in the Agglomerator may be fed directly to the Crusher, as indicated by broken line 107. Alternatively, the moist green solids from the Agglomerator may be fed directly to the Drier-Classifier, as indicated by lines 108 and 111.

In the Drier-Classifier, the green agglomerates are charged to a moving bed reactor such as a fluid bed reactor and contacted with a stream of sulfur-free gas fed as indicated by line 112. Water is evaporated, surface area is created by expulsion of the water from the interior of the particles, the partially water soluble cement (iron sulfate) between finely divided solids in the agglomerated particle is "cured", and the moist soft feed is converted to hardened agglomerated particles of dry porous solids that are high in both surface area and mechanical strength, and when contacted with sulfur-bearing gases, are suitable as sorbents for sulfur compounds.

The hot sulfur-free gas utilized in the Drier-Classifier is controlled in temperature to remove the desired quantity of water from the solids, and in flow rate to remove undersized particles of solids from the product by elutriation from the fluid bed.

The dry solids that remain in the bed of the fluid bed Drier-Classifier are withdrawn as the prepared sorbent product of the process, as indicated by line 113, and are available for use in the gas treatment processes described above. The gas-solids mixture from the Drier-Classifier is fed to the Gas Cleaner as indicated by line 114 where the elutriated solids are separated from the gas, and the clean gas is discharged to the atmosphere as indicated by line 115. The solids removed from the gas in the Gas Cleaner are recycled to the Agglomerator as indicated by line 104.

When the sorbent preparation process described above is to be utilized for the desulfurization of oxygen and sulfur-bearing combustion gases, recycled iron sulfate product, and iron oxides obtained from the low temperature decomposition of iron sulfates, are employed as major components of the feed. Moreover, the recycled feed materials generally will contain, as a major component, activated magnetite ($Fe_3O_4$) bearing solids. Water soluble components such as iron sulfates generally will be used as cement between particles of finely divided solids in the agglomeration procedure, and the recycled feed materials generally will contain iron sulfates.

Figure 2:
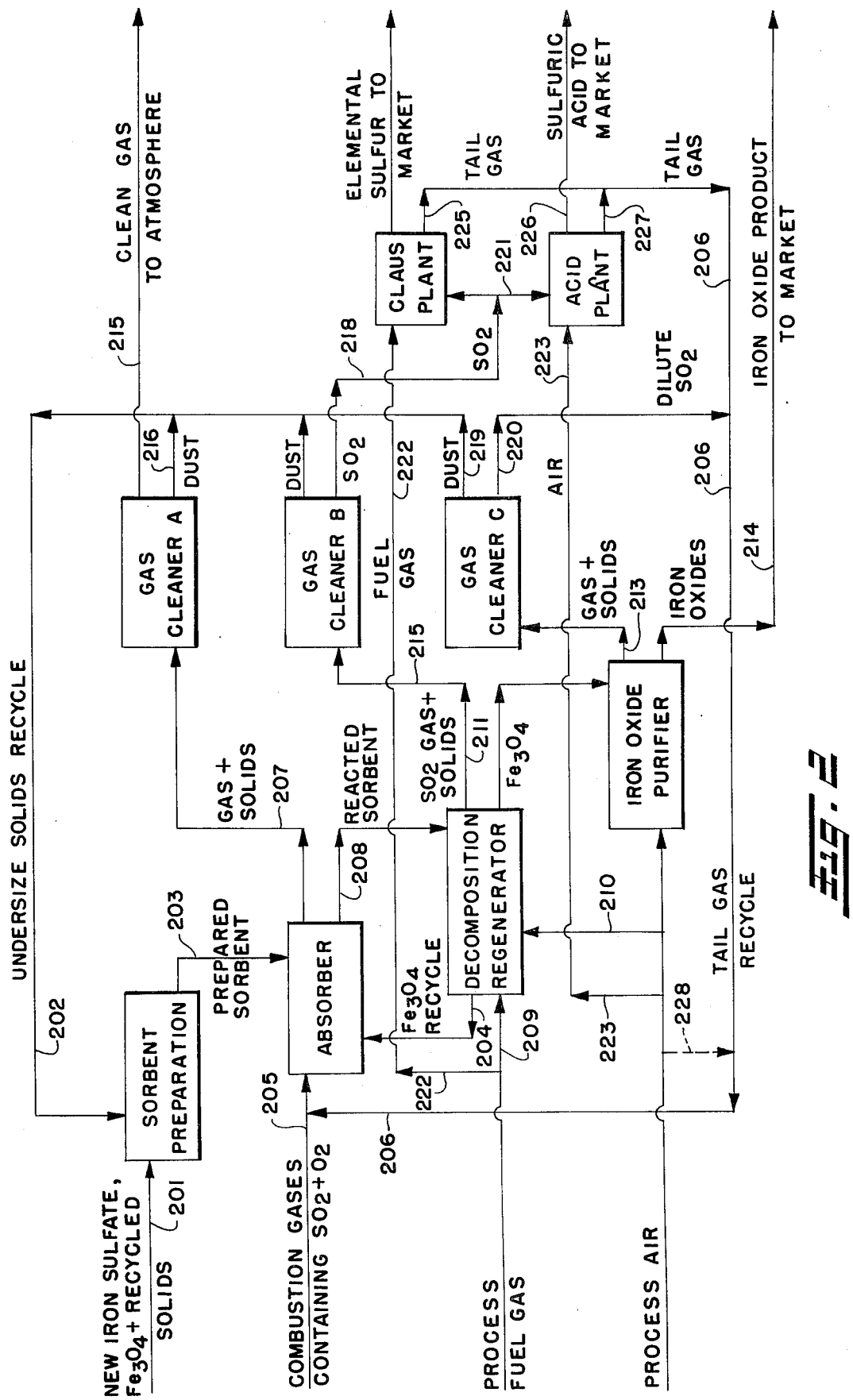
FIG. 2 is a flow diagram illustrating the preparation and regenerative utilization of agglomerated sorbent materials in conjunction with the desulfurization of an oxidizing gas.

The utility of the iron-bearing sorbent solids of this invention for desulfurizing oxygen-bearing combustion gases and for generating both effluent gases acceptable for discharge to the atmosphere, and both iron and sulfur products of commercial quality from objectionable industrial effluents, is illustrated in FIG. 2, and is described in detail with reference to this figure, as follows:

Available new iron sulfate, iron oxide and/or iron-bearing solids recycled from the gas treatment process including the iron oxide-bearing solids obtained from the decomposition regenerator and/or the iron oxide Purifier illustrated in FIG. 2, are fed to the Sorbent Preparation system, as indicated by line 201. Additional undersized solids reclaimed from Gas Cleaners A, B, and C alao are fed to the sorbent preparation process, as indicated by line 202. The Sorbent Preparation system of FIG. 2 comprises procedures such as illustrated in FIG. 1. As an alternative in FIG. 2, the prepared sorbent fed to the Absorber, as indicated by line 203 in FIG. 2, may be replaced by line 113 representing the prepared sorbent removed from the Drier-Classifier in FIG. 1 thereby incorporating the flow sheet of FIG. 1 into FIG. 2. In addition to the prepared sorbent fed to the Absorber as indicated by line 203, recycled solids containing highly active magnetite ($Fe_3O_4$) from the Decomposition Regenerator are fed to a gas-solids contacting reactor system within the Absorber as indicated by line 204.

Both new and recycled dilute sulfur dioxide (less than 2% $SO_2$) and oxygen-bearing combustion gases also are fed to the Absorber, as indicated by lines 205 and 206, respectively. The gas is reacted with the solids at temperatures between about 250° and 550° C., and preferably between 325° and 450° C. to generate, as products of the Absorber, both ferric sulfate-bearing solids, and a combustion gas reduced in sulfur content. The spent sorbent solids from the Absorber are charged to a gas-solids contacting Decomposition Regenerator, as indicated by line 208. Fuel gas and air also are added to the feed materials, as indicated by lines 209 and 210, respectively. The feed rates of both gases and solids to the Decomposition Regenerator are regulated in quantity to generate temperatures between about 300° and 750° C. and preferably between 500° and 650° C. in the reaction zone of the decomposition equipment. Moreover, the ratio of the solid and gaseous feed materials to the reaction zone of the Decomposition Regenerator provide oxidizing and reducing agents at stoichiometric ratios that promote the formation of iron oxides, and generate chemically reactive $Fe_3O_4$ as a major component of the iron oxide-bearing product of the decomposition reactor. In additon to the chemically reactive $Fe_3O_4$, the decomposition regenerator also produces a gas high in content of sulfur dioxide.

When new iron sulfate is utilized as a feed to the sorbent preparation process, for example, when there is an abundant source of iron sulfate available to the process from other sources, at least a fraction of the magnetite-bearing product from the decomposition regenerator is fed to gas-solids contacting reactor of the iron oxide Purifier, as indicated by line 211. Process air also is fed to this Purifier, as indicted by line 212, and said air is reacted with the magnetite in quantities sufficient to remove the remaining sulfur from the iron oxide product. The essentially sulfur-free iron oxide product from the Purifier is discharged as product from the process, as indicated by line 214.

The remaining fraction of the magnetite-bearing product from the decomposition regenerator is recycled to the absorber, as indicated by line 204. Although not indicated in FIG. 2, when the magnetite-bearing product from the decomposition regenerator becomes deactivated by densification and loss of surface area, a fraction of this product is recycled to the sorbent preparation process rather than to the absorber. The process steps of the sorbent preparation process described in FIG. 1 are successful in reducing the density of the solid product and increasing surface area, thereby regenerating the reactive properties of these solids.

Also exiting from the Absorber in FIG. 2 is a gas reduced in sulfur content that contains fine solids elutriated from the bed of the Absorber by the gas. The solids-bearing, but essentially sulfur-free product gas from the Absorber, is fed to Gas Cleaner A as indicated by line 207. The contained solids are separated from the gas and recycled to the sorbent preparation process, as indicated by lines 216 and 202. The clean gas is discharged to the atmosphere, as indicated by line 215.

The concentrated sulfur dioxide and solids-bearing product gas from the Decomposition Regenerator is fed to Gas Cleaner B as indicated by line 215. The solids are separated from the gas and recycled to the Sorbent Preparation process, as indicated by lines 217 and 202. The sulfur dioxide-bearing clean gas from Gas Cleaner B is used as feed gas to either the Claus Plant and/or to the Acid Plant, as indicated by lines 218 and 221. In the Claus Plant, the sulfur dioxide gas from Gas Cleaner B is reacted with fuel gas fed to the Claus Plant as indicated by arrow 222, to produce elemental sulfur. In the Acid Plant, the sulfur dioxide gas reacts with air supplied, as indicated by line 223, to produce sulfuric acid of commercial quality. The acid is discharged as a product of the process as indicated by line 226. The sulfur-bearing tail gases from both the Claus Plant and the Acid Plant are recycled to the Absorber as indicated by lines 225, 227 and 206.

The dilute sulfur dioxide and solids-bearing product gas from the iron oxide Purifier is fed to Gas Cleaner C, as indicated by line 213. The solids are separated from the gas and recycled to the sorbent preparation process, as indicated by line 219. The dilute sulfur-bearing but solids-free product gas from Gas Cleaner C is recycled to the Absorber, as indicated by lines 220 and 206. Should the combined feed gas to the Absorber be low in content of oxygen, process air is added to this gas stream as indicated by discontinuous line 228.

An example of the combined process of this invention utilizing the iron oxide sorbent prepared in accordance with the process of the invention for desulfurizing separate streams of hot reducing gases and oxygen-bearing combustion gases is illustrated on the flow diagram of FIG. 3 and is described in detail with reference to this figure as follows:

A hot reducing as containing hydrogen, carbon monoxide and hydrogen sulfide is fed to a gas-solids contacting desulfurizer, as indicated by line 301. Iron oxides from the Decomposition Regenerator also are fed to the Desulfurizer as indicated by line 302. The solids are reacted with the feed gas to generate product solids containing iron sulfides and a reducing gas containing less sulfur than the initial reducing gas.

Although not indicated in FIG. 3, a portion or all of the iron oxide-bearing solids from the Decomposition Regenerator may be oxidized to hematite ($Fe_2O_3$) in contact with air at low temperature before the solids are recycled as indicated by line 302 to the Desulfurizer, by line 308 to the Sorbent Preparation system, and by line 313 to the Absorber.

When iron-bearing prepared sorbents are to be utilized in the desulfurization of reducing gases at gas-solids contacting temperatures above 750° C, magnesium and/or aluminum oxides, hydroxides, carbonates and/or sulfates are used as part of the new feed to the sorbent preparation procedures of the process. Moreover, the molecular ratio of magnesium and/or aluminum to iron in the new feed materials is increased with each increase in the operating temperature of the gas-solids contacting desulfurization absorber. This ratio may approach or exceed 50% at gas-solids contacting temperatures in excess of 1000° C. The total supply of solids to the sorbent preparation procedures of the process contains both new feed materials, as indicated by line 306, and previously utilized sorbent solids recovered from the Decomposition Regenerator and/or the gas cleaning equipment, as indicated by lines 308 and 307, respectively.

The porous dry agglomerated products from the Sorbent Preparation system described previously with respect to FIG. 1 are fed to the Absorber as indicated by line 309. A fraction of the iron sulfide-bearing product from the Desulfurizer also is fed to the gas-solids contacting Absorber as indicated by line 304. The remaining fraction of the iron sulfide-bearing solids from the Desulfurizer is fed to the Decomposition Regenerator as indicated by line 305. Each of the above fractions of the product from the desulfurizer is utilized as fuel in the Absorber and as fuel and a reductant in the Decomposition Regenerator. The quantity of each portion is determined by the thermal requirements of each process and the heat balance of the combined process. Sulfur-bearing stack gases containing sulfur dioxide and oxygen are fed to the Absorber as indicated by line 310. Process air also is used in the Absorber as required by the proces and as indicated by lines 312 and 311. The sulfur-bearing gases are reacted with the feed solids in the Absorber to generate product solids that contain ferric sulfate and gases of reduced sulfur content.

The iron sulfate-bearing product from the Absorber is fed to the Decomposition Regenerator as indicated by line 330. Process air also is fed to this regenerator as indicated by line 314 and is utilized in quantities that provide oxygen sufficient to react with the available iron sulfide in the solid feed. The products from this process are iron oxide-bearing solids high in content of $Fe_3O_4$ and a gas high in concentration of sulfur dioxide. The sulfur dioxide-bearing product gas from the Decomposition Regenerator is fed to Gas Cleaner C as indicated by line 315. The solids are separated from the gas and recycled to the sorbent preparation process as indicated by lines 316 and 307. The clean sulfur dioxide product gas from Gas Cleaner C is fed to either the Claus Plant and/or to the Acid Plant, as indicated by lines 317 and 318. Reducing gas from Gas Cleaner A, may be fed to the Claus Plant as indicated by line 319, and elemental sulfur may be produced and removed as indicated by line 321. Process air is fed to the Acid Plant as indicated by line 320, and the sulfuric acid product is removed as indicated by line 322. Sulfur-bearing tail gases recovered from both the Claus Plant and the Acid Plant are collected and recycled to the Absorber, as indicated by lines 323, 324 and 311.

The hot reducing gas from the Desulfurizer, which may contain finely divided solids, is fed to Gas Cleaner A as indicated by line 303. The solid are separated from the gas and recycled to the sorbent preparation process, as indicated by lines 325 and 307. The clean reducing gas product from Gas Cleaner A, to the extent it is not used in the Claus Plant, is discharged for industrial use or marketed as a fuel gas as indicated by line 326.

The product gas from the desulfurization absorber, which contains solids but is essentially free of objectionable quantities of sulfur compounds, is fed to the Gas Cleaner B, as indicated by line 327. The solids are separated from the gas and recycled to the sorbent preparation process, as indicated by lines 328 and 307. The clean product gas is discharged to the atmosphere as an effluent of acceptable quality as indicated by line 329.

The following examples illustrate the procedures of this invention. Unless otherwise indicated, all parts and percentages are by weight.

EXAMPLE 1

Finely divided (−200 mesh) iron-bearing dry solids containing both iron oxides generated from iron sulfate at temperature below 750° C., and about 10% by weight of finely divided ferrous sulfate are blended to provide a uniform mixture. Water is added to the above mixture in the form of a finely divided spray, and the solids and liquids are mixed in a mechanical blender to generate moist agglomerated solids that are essentially free of individual particles smaller than ten microns in diameter.

The above agglomerated solids are sized on twenty mesh screens, the oversize particles are crushed and recycled to the screens, and the smaller solids are collected as the useable product of the agglomeration and sizing procedures of the process.

The above collected useable product from the screens is contacted with hot sulfur-free gases at a temperature of about 150° C. in the bed of a fluid bed reactor. Water is thereby evaporated from the interior of the particles, and the water soluble and reversibly hydratable iron sulfate-bearing cement between the finely divided solids is cured. The gas stream to the fluid bed is controlled in both temperature and flow rate to remove both the desired quantity of water from the solids, and to elutriate from the fluid bed of the reactor, solids smaller than about 200 microns in particle size.

In use, the above agglomerated and classified solids are contacted with a gas containing about 0.5% $SO_2$ and about 2.0% oxygen, at a temperature of about 450° C. in the bed of a fluid bed reactor. The product gas from the reactor contains about 200 ppm of total oxides of sulfur, and the product solids from the bed contain ferric sulfate as a major component.

EXAMPLES OF REGENERATION PROCESS

EXAMPLE 2

Approximately 24,000 grams of the ferric sulfate-bearing solids produced by the procedures of Example 1 and containing particles smaller than 48 mesh in maximum size, are processed in contact with a stream of gas containing approximately 65% $N_2$, 18.8% CO, 10% $CO_2$ and 6.2% $H_2O$ in a fluid bed reactor at an operating temperature of approximately 600° C., and over a continuous operating period of approximately six hours.

The average composition of the product gas from the above test is approximately 22.0% $SO_2$, 54.0% $N_2$, 0.0% CO, 22.0% $CO_2$ and 2.0% $H_2O$ during the above test period. The average composition of the $Fe_3O_4$-bearing product from the bed of the reactor is approximately 69.0% Fe, 1.0% S and 30.0% $O_2$.

EXAMPLE 3

The procedures of Example 2 are repeated at an average operating temperature of 550° C in the bed of the reactor.

The average composition of the product gas is approximately 17.0%, $SO_2$, 60.0% $N_2$, 0.1% CO, 20.0% $CO_2$ and 2.9% $H_2O$. The average composition of the $Fe_3O_4$-bearing product from the bed of the reactor is 65.45% Fe, 2.67% S, with the remainder being $O_2$ and miscellaneous impurities.

EXAMPLE 4

The ferric sulfate-bearing product from Example 1 is mixed with ferrous sulfide-bearing solids to produce mixed iron-bearing solids in which approximately 10% of the iron content is present in the form of ferrous sulfide.

Approximately 200 grams of the above mixed solids are heated to a temperature of approximately 600° C. in contact with nitrogen for a period of approximately three hours. The product solids from this procedure contain 0.35% sulfur and the remaining components are iron and oxygen combined in the ratio of $Fe_3O_4$.

Although the invention has been shown and described with respect to certain preferred embodiments, equivalent operations and modifications will occur to others skilled in the art upon the reading and understanding of this specification. The present invention includes all such equivalent alterations and modifications and is limited only by the scope of the claims.

I claim:

1. A process for the preparation and utilization of sorbent solids having particular utility in reducing the sulfur compound content of combustion gases and reducing gases, which comprises the steps of:
   a. mixing (i) finely divided solids containing a compound, selected from the group consisting of iron and calcium compounds, as an active component, with (ii) a liquid selected from the group consisting of water, sulfuric acid, and solutions containing sulfuric acid to produce agglomerated particles of moist solids that contain water soluble and reversibly hydratable compounds, which solids are essentially free of individual particles smaller than ten microns in diameter,
   b. drying the above agglomerated moist solids by contact with relatively sulfur-free gases in a fluid bed drier, at temperatures between 80° and 300° C., to remove the water therefrom and thereby to produce porous dry solids containing agglomerated particles high in surface area and to cure water soluble and reversibly hydratable compounds and thereby to produce particles high in mechanical strength,
   c. modulating the flow rate of gas in contact with the above solids to elutriate from the fluid bed of the drier, a major fraction of the particles smaller than about 200 microns in diameter,
   d. collecting a fraction of the classified, porous, agglomerated, dry solids that remain in the bed of the drier, as product of the sorbent preparation procedures of the process,
   e. utilizing the collected sorbent solids by contact with sulfur-bearing gases in gas-solids contacting equipment to generate, as products of the process, spent sorbent solids containing sulfur compounds, and a gas reduced in content of sulfur, and
   f. repetitively regenerating and reusing at least a major fraction of said spent solids.

2. The process of claim 1 in which,
   a. the agglomerated particles of moist solids are separated into at least two fractions on the basis of particle size,
   b. the ovesize particle fractions are crushed to the desired particle size, and
   c. the crushed product is utilized as part of the feed to the drying step.

3. The process of claim 1 in which
   a. finely divided solids in the product gases from gas-solids contacting procedures of the process are separated from the gases, and
   b. major fractions of these separated solids are recycled for use as part of the feed to the mixing and agglomerating step.

4. The process of claim 1 in which,
   a. a fraction of the sulfur compound-bearing spent sorbent solids from the utilizing step is regenerated in contact with gases, and
   b. at least a fraction of the regenerated sorbent is recycled directly as part of the feed to the utilization step.

5. The process of claim 4 in which,
   a. a fraction of the regenerated solids is recycled as part of the feed to the mixing and agglomerating step.

6. The process of claim 5 in which,
   a. a fraction of the regenerated solids is reduced in particle size prior to recycle as part of the feed to the mixing and agglomerating step, to minimize accumulation of densified, inert particles as a function of repetitive regeneration and recycling.

7. The process of claim 1 in which,
   a. calcium compounds are the active component of the prepared sorbent, and
   b. at least part of the feed to the mixing and agglomerating step comprises finely divided calcium-bearing industrial materials, selected from the group consisting of limestone, lime and dolomite.

8. The process of claim 1 in which,
   a. iron compounds are the active component of the prepared sorbent, and
   b. at least part of the feed to the mixing and agglomerating step comprises finely divided industrial materials, selected from a group of such materials containing iron sulfates, iron sulfides, iron oxides, iron hydroxides, iron carbonates, and metallic iron as major components.

9. The process of claim 8 in which,
   a. at least part of the iron-bearing feed to the utilizing step comprises iron oxides that are generated from iron sulfates at temperatures of generation below 700° C; and under conditions that provide $Fe_3O_4$ as a major component of the iron content of the regenerated oxides.

10. The process of claim 9 in which,
    a. the feed gas to the utilization step is at temperatures between 250° and 550° C and contains both oxygen and oxides of sulfur.

11. The process of claim 8 in which,
    a. the feed gas to the utilization step is a reducing gas containing hydrogen sulfide, b. iron sulfide-bearing spent sorbent from the utilization step is regenerated by oxidation in contact with air, to produce iron oxide, and c. a fraction of the regenerated sorbent solids is recycled for use as part of the iron-bearing feed to the utilization step.

12. The process of claim 11 in which, a. the iron sulfide-bearing spent sorbent solids are regenerated in contact with both air and solids that contain iron sulfates.

13. The process of claim 12 in which, a. iron sulfide-bearing spent sorbent solids from the utilization step are regenerated under conditions that produce $Fe_3O_4$ as a major component of the iron oxide content of the regenerated sorbent.

14. The process of claim 11 in which, a. the reducing gas is desulfurized at temperatures above 750° C and in contact with prepared iron-bearing sorbent solids that contain finely divided particles of chemically inert or refractory oxides of magnesium and/or aluminum intimately dispersed within particles of porous agglomerated iron-bearing solids.

15. The process of claim 14 in which, a. the iron-bearing feed materials to the sorbent preparation step contain finely divided industrial materials, selected from the group conisting of materials that contain oxides, hydroxides, carbonates, and sulfates of magnesium and aluninum as major components, and b. the magnesium and aluminum compounds are converted to refractory oxides in agglomerated particles of the sorbent solids.

16. The process of claim 1 in which, a. a fraction of the product gas from the utilization step os recycled for use as part of the feed gas to the drying step.

* * * * *